US007148450B2

(12) United States Patent
Lin et al.

(10) Patent No.: US 7,148,450 B2
(45) Date of Patent: Dec. 12, 2006

(54) PORTABLE BLACKBODY FURNACE

(75) Inventors: John Lin, Jhudong Township (TW); Chau Min Chen, Hsinchu (TW); Chun Miing Hsu, Hsinchu (TW); Hui Mei Tai, Hsinchu (TW); Hsin Yi Ko, Hsinchu (TW); Chun Jen Lin, Hsinchu (TW); Chuen Yuann Liou, Hsinchu (TW)

(73) Assignee: Industrial Technology Research Institute, Hsinchu County (TW)

( * ) Notice: Subject to any disclaimer, the term of this patent is extended or adjusted under 35 U.S.C. 154(b) by 0 days.

(21) Appl. No.: 11/250,386

(22) Filed: Oct. 17, 2005

(65) Prior Publication Data

US 2006/0081598 A1 Apr. 20, 2006

(30) Foreign Application Priority Data

Oct. 20, 2004 (TW) .............................. 93131777 A

(51) Int. Cl.
*G01K 15/00* (2006.01)
*F27D 1/00* (2006.01)
*F27B 17/00* (2006.01)

(52) U.S. Cl. ....................... 219/420; 219/385; 219/407; 373/111; 373/117; 374/2

(58) Field of Classification Search ..................... None
See application file for complete search history.

(56) References Cited

U.S. PATENT DOCUMENTS 4,435,092 A * 3/1984 Iuchi .......................... 374/129
5,608,838 A * 3/1997 Brookley ..................... 392/407
5,988,874 A * 11/1999 Rohner ........................... 374/2
6,365,877 B1 * 4/2002 Chen et al. .................. 219/400
6,467,952 B1 * 10/2002 Morisaki et al. ............ 374/129

FOREIGN PATENT DOCUMENTS

JP 03250642 * 11/1991

OTHER PUBLICATIONS

"Encyclopedia of Science & Technology", McGraw-Hill Publishing Co., Heat Radiation, p. 514 (1982).

* cited by examiner

*Primary Examiner*—Joseph Pelham
(74) *Attorney, Agent, or Firm*—Volentine Francos & Whitt, PLLC

(57) ABSTRACT

The present invention discloses a portable blackbody furnace comprising a metallic body, a cylindrical cavity with a tapered end in the metallic body, a shielding plate positioned at an open end of the cylindrical cavity, at least a first heaters positioned in the shielding plate, a plurality of second heaters positioned around the metallic body, and a plurality of thermometers positioned in the metallic body. Preferably, the heat capacity of the metallic body is larger than 200 Joules/K, and has radial thickness larger than 5 mm. There are grooves formed on the outer wall of the metallic body, and the second heaters are heating wires embedded inside the grooves. In addition, the flow direction of the current between two adjacent heating wires is opposite to eliminate the magnetic field generated from the current flow.

25 Claims, 5 Drawing Sheets

PORTABLE BLACKBODY FURNACE

BACKGROUND OF THE INVENTION (A) Field of the Invention

The present invention relates to a portable blackbody furnace with high temperature stability and uniformity, and more particularly, to a portable blackbody furnace with temperature high stability and uniformity, which is suitable for the temperature calibration of radiation thermometers.

(B) Description of the Related Art

FIG. 1 is a cross-sectional diagram of a conventional blackbody furnace 10 for the temperature calibration of radiation thermometers. The blackbody furnace 10 comprises a metallic sheet 20, a heater 22, and a plurality of thermometers 24, wherein the metallic sheet 20 forms an internal cavity 14 with an opening 16. The space between the metallic sheet 20 and the shell 28 is filled with insulation material 26 to avoid heat loss. During the temperature calibration process, the metallic sheet 20 is heated to a predetermined temperature such as 38° C. by the heaters 22, the probe head of the radiation thermometer is positioned into the internal cavity 14 in the metallic sheet 20 through the opening 16 to detect the temperature of the internal cavity 14, and the detected temperature is used as a standard temperature to calibrate the radiation thermometer.

The metallic sheet 20 is used to form the internal cavity 14, and the temperature of the metallic sheet 20 is controlled primarily by a controller (not shown in the drawings) via the heater 22. However, during the temperature calibration of the radiation thermometer, a portion of heat emits from the blackbody furnace 10 via the opening 16 and the radiation thermometer also captures heat from the internal cavity 14, which results in a dramatic decrease of the temperature in internal the cavity 14. In other words, the temperature uniformity and stability in the internal cavity 14 are poor, and the correctness of the temperature calibration is easily to be influenced. As a result, the blackbody furnace 10 must be incorporated with a high precise controller to ensure the temperature stability in the internal cavity 14, and the precise controller dramatically increases the total cost.

FIG. 2 is a cross-sectional diagram of another conventional blackbody furnace 50. The blackbody furnace 50 comprises a metallic sheet 60 with a thickness about 2 millimeters and a shielding plate 52, wherein the metallic sheet 60 forms an internal cavity 54. During the temperature calibration process, the blackbody furnace 50 is immersed to a predetermined level 62 in a tank that is filled with liquid such as water or oil and maintained at a constant temperature, and the probe head of the radiation thermometer is positioned into the internal cavity 54 via an opening 56 to detect the temperature in the internal cavity 54. Particularly, the blackbody furnace 50 uses the liquid with a great amount of heat capacity in the tank to decrease the heat loss during the temperature calibration of the radiation thermometer so at to ensure the temperature stability. However, the volume and weight of the blackbody furnace 50 is very huge and weighty, which is not suitable to be portable.

SUMMARY OF THE INVENTION

The objective of the present invention is to provide a portable blackbody furnace with high temperature uniformity and stability, which is suitable for the temperature calibration of radiation thermometer.

In order to achieve the above-mentioned objective and avoid the problems of the prior art, one embodiment of the present invention discloses a portable blackbody furnace comprising a metallic body, a cavity with a tapered end in the metallic body, a shielding plate positioned at an open end of the cavity, at least a first heaters positioned in the shielding plate, a plurality of second heaters positioned around the metallic body, and a plurality of thermometers positioned in the metallic body. Preferably, the heat capacity of the metallic body is larger than 200 Joules/K, and has radial thickness larger than 5 mm. There are grooves formed on the outer wall of the metallic body, and the second heaters are heating wires embedded inside the grooves. In addition, the flow directions of the currents between two adjacent heating wires are opposite to eliminate the magnetic field generated from the current flow.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Figure 3:
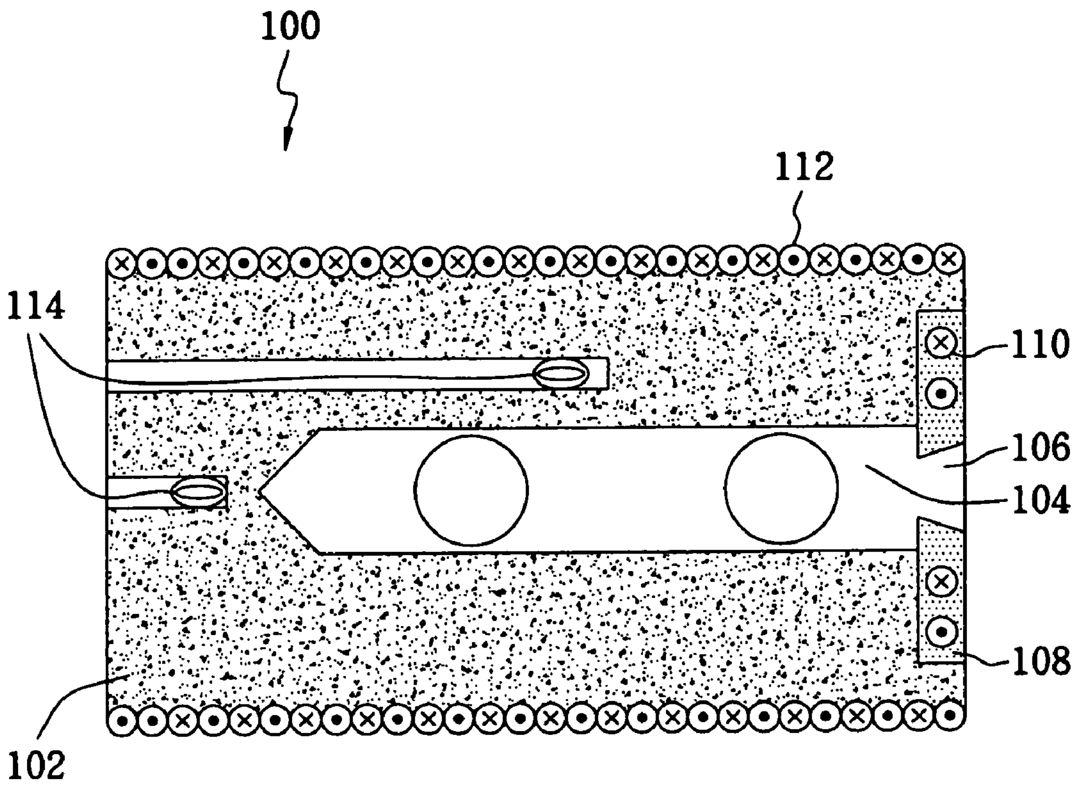
FIG. 3 is a cross-sectional diagram of a portable blackbody furnace according to one embodiment of the present invention.

FIG. 3 is a cross-sectional diagram of a portable blackbody furnace 100 according to one embodiment of the present invention. The portable blackbody furnace 100 comprises a metallic body 102 with a cavity 104, a shielding plate 108 positioned at an open end 106 of the cavity 104, two first heaters 110 positioned in the shielding plate 108, a plurality of second heaters 112 positioned around the metallic body 102, and two thermometers 114 positioned in the metallic body 102.

The cavity 104 is cylindrical with a diameter about 10 mm, and the cavity 10 has an awl-shaped end, i.e., a taped end in the metallic body 102. Preferably, the heat capacity of the metallic body 102 is larger than 200 Joules/K, and has radial thickness larger than 5 mm. There are grooves formed on the outer wall of the metallic body 102, and the second heaters 112 are heating wires embedded inside the grooves. In addition, the flow directions of the currents between two adjacent heating wires are opposite to eliminate the magnetic field generated from the current flow.

The metallic body 102 is made of oxygen free cupper with high thermal conductivity, which can promptly transfer heat generated by the second heaters 112 to an interface between the cavity 104 and the metallic body 102 to maintain the temperature of the cavity 104. In addition, the outer wall of the metallic body 102 may be coated with a layer of high thermal conductive material and the second heaters 112 can then be positioned on the layer to reduce the thermal resistance between the second heaters 112 and the metallic body 102.

The first heaters 110 in the shielding plate 108 can promptly heat the shielding plate 108 to prevent the temperature at the open end 106 of the cavity 104 from being influenced by the outer airflow. Preferably, the thickness of the shielding plate 108 is between 5 and 15 mm, which can keep the temperature at the open end 106 at the same as that in the cavity 104, and improve the heat transfer efficiency from the second heaters 112 to the open end 106.

Figure 4:
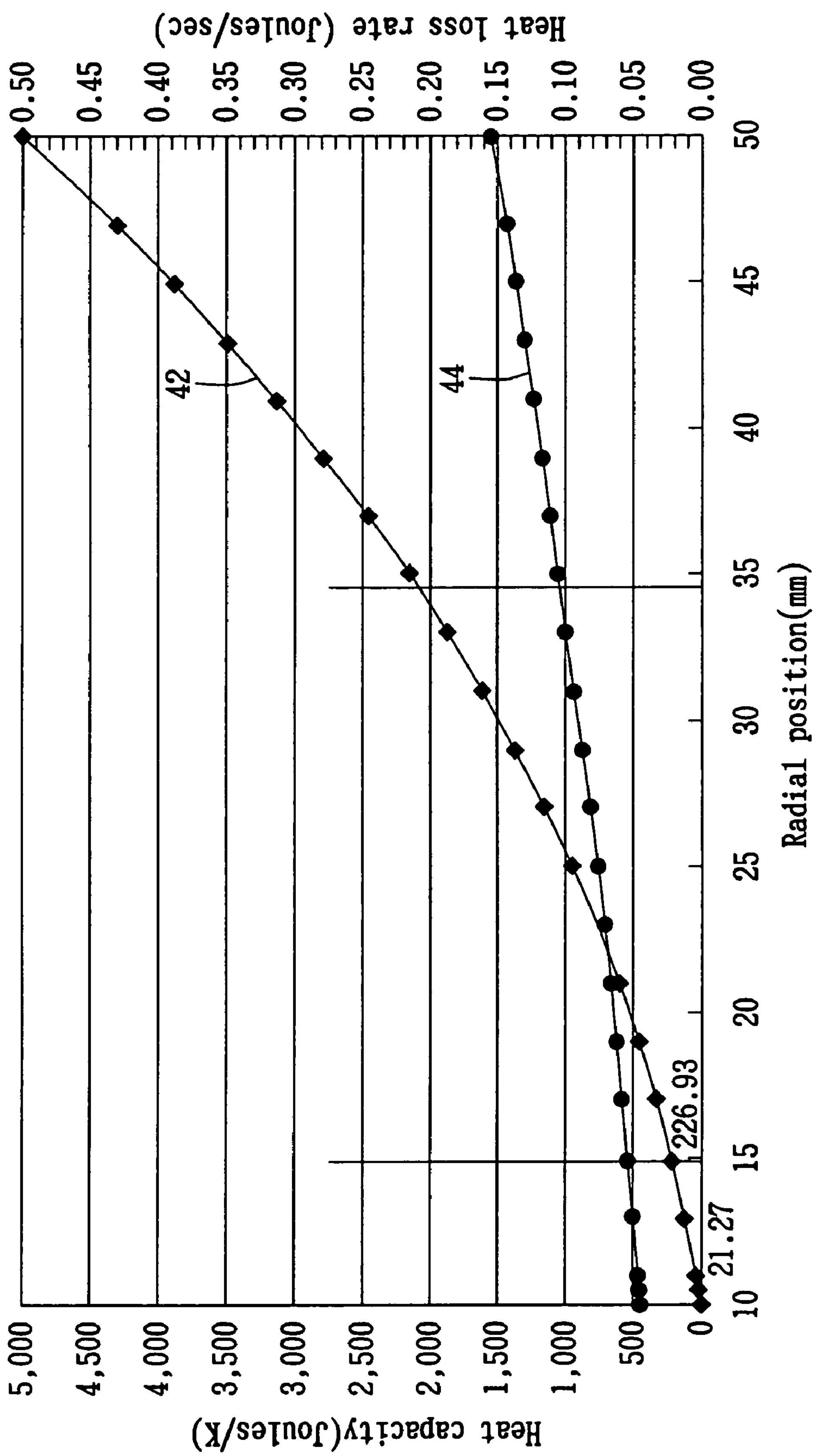
FIG. 4 shows the relationship between the radial thickness and the thermal properties of the portable blackbody furnace according to one embodiment of the present invention.

FIG. 4 shows the relationship between the radial thickness and the thermal properties of the portable blackbody furnace 100 according to one embodiment of the present invention, wherein the diameter of the cavity 104 is 10 mm. Curve 42 represents the relationship between the radial thickness and the heat capacity, and Curve 44 represents the relationship between the radial position and the heat loss rate. The heat capacity of the portable blackbody furnace 100 is 21.27 Joules/K at a radial thickness about 0.1 mm, 226.93 Joules/K at a thickness about 4.9 mm, and 2100 Joules/K at a thickness about 24.1 mm. In other words, the heat capacity of the portable blackbody furnace 100 increases by ten times as the radial thickness increases by 4.9 mm, and increases by one hundred times as the radial thickness increases by 24 mm.

During the temperature calibration process of the radiation thermometer by inserting the probe heat into the cavity 104 via the open end 106 to detect the temperature of the cavity 104, it is estimated that the radiation thermometer will carry heat about 10 Joules per second out of the cavity 104 from the open end 106. If the safety coefficient is designed to be 2 to limit the temperature variation of the portable blackbody furnace 100 due to the calibration of the radiation thermometer within 0.1° C., the heat capacity of the portable blackbody furnace 100 is preferably larger than 200 Joules/K, i.e., the radial thickness of the metallic body 102 is larger than 5 millimeters. Preferably, the ratio between the radial thickness of the metallic body 102 and the radius of the cavity 104 is larger than 1.5, and the ratio between the heat capacity of the metallic body 102 and the heat loss rate is larger than 4200.

Figure 5:
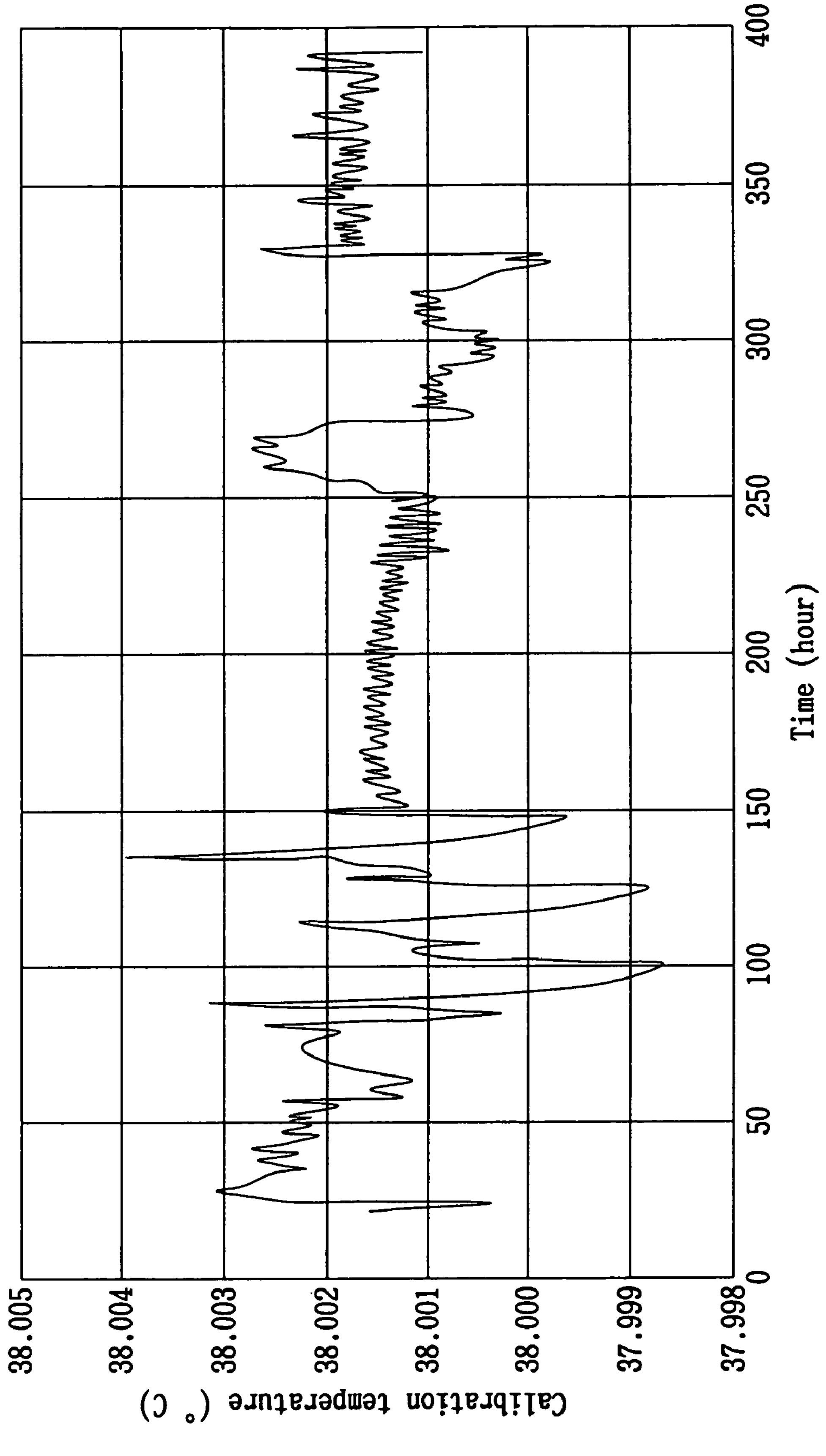
FIG. 5 shows the stability test of the portable blackbody furnace according to one embodiment of the present invention.

FIG. 5 shows the temperature stability test of a portable blackbody furnace 100 according to one embodiment of the present invention, wherein the heaters are controlled by simple on/off operations. The calibration temperature is kept within 2 mK in 400 hours, i.e., about 16 days. In other words, the present portable blackbody furnace 100 possesses a very high temperature stability of 2 mK in two weeks. On the contrary, the conventional blackbody furnace only possesses a stability of 0.1 K in one hour under the same simple on/off control. As the increase of the heat capacity, the precision requirement of the temperature controller is decreased correspondingly. For example, the precision requirement of the temperature controller can be decreased by ten times as the heat capacity is increased by ten times. Consequently, the present invention can use a simple temperature controller and achieves a high stable and uniform temperature control.

Figure 1:
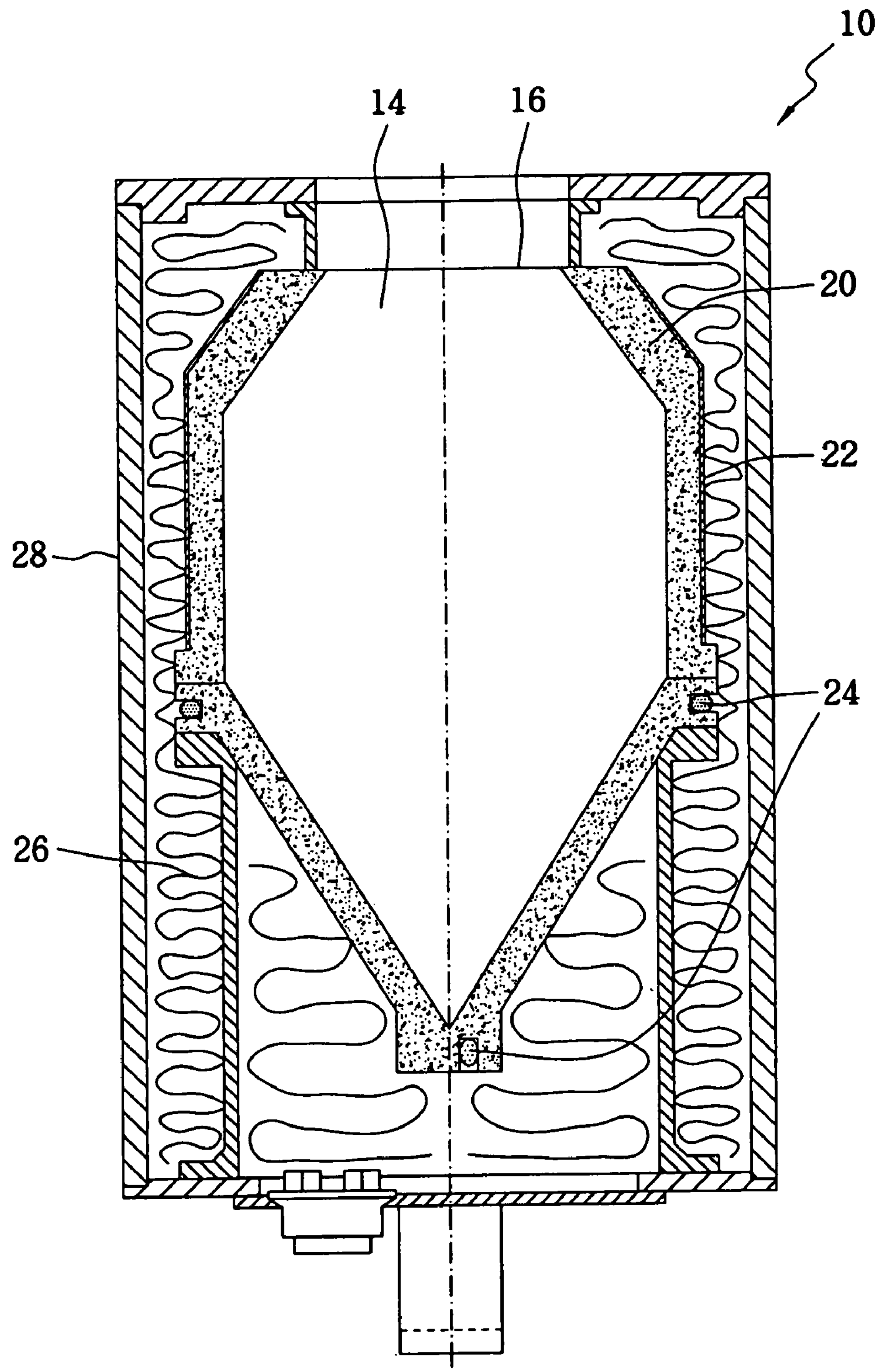
FIG. 1 (Background Art)
FIG. 1 is a cross-sectional diagram of a conventional blackbody furnace.

Compared to the blackbody furnace 10 shown in FIG. 1, the present portable blackbody furnace 100 possesses a higher heat capacity, which can prevent the temperature of the cavity 104 from being disturbed dramatically by the temperature calibration of the radiation thermometer, and therefore possesses higher temperature stability. In addition, the first heaters 110 in the shielding plate 108 can maintain the temperature at the open end 106 at the same as that in the cavity 104, and therefore the present portable blackbody furnace 100 possesses higher temperature uniformity.

Figure 2:
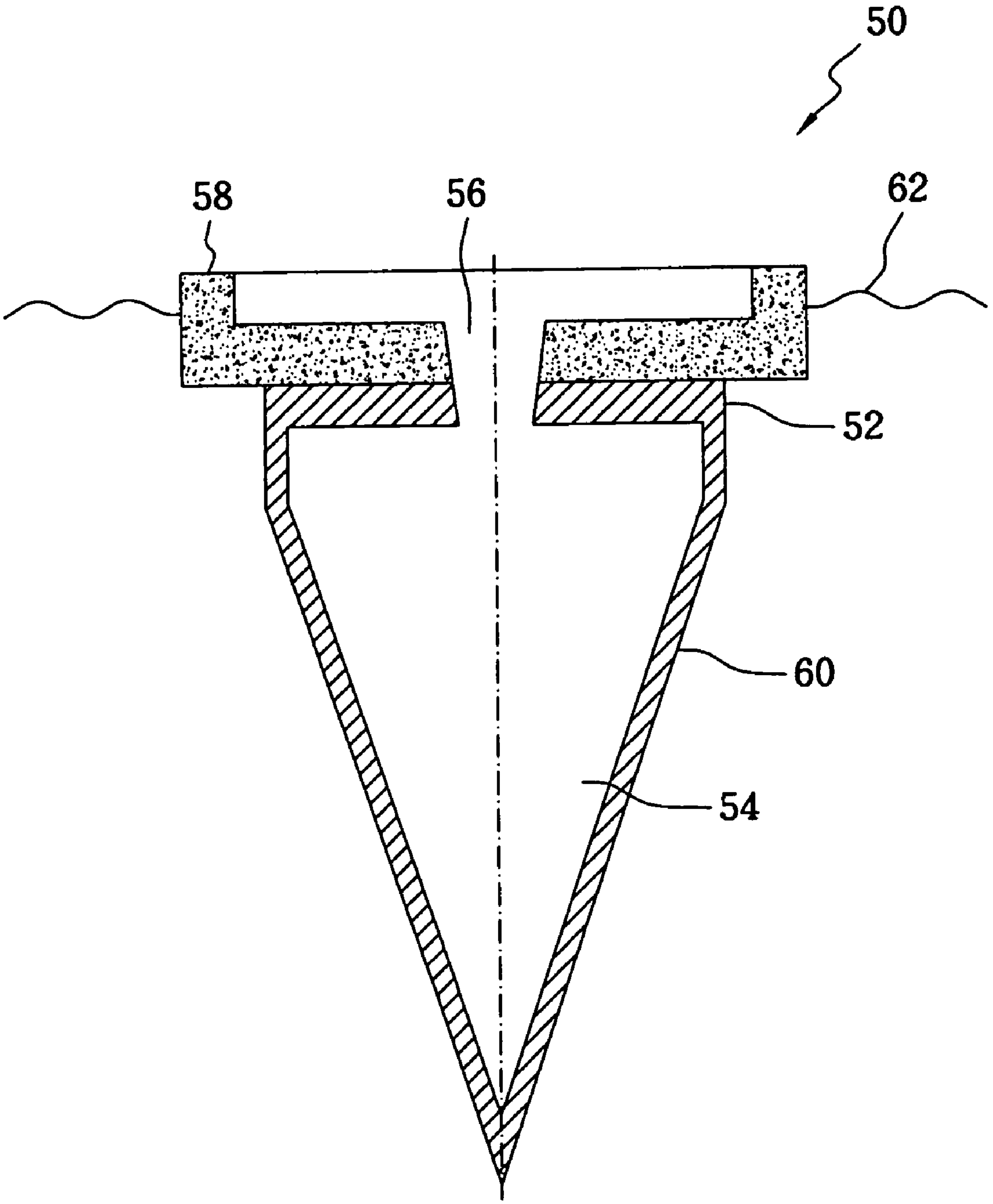
FIG. 2 (Background Art)
FIG. 2 is a cross-sectional diagram of another conventional blackbody furnace.

The blackbody furnace 50 in FIG. 2 is not suitable to be portable due to using a huge amount of liquid. Inversely, the present portable blackbody furnace 100 uses the heat capacity of the metallic body 102 to compensate the heat loss by the heat exchange between the radiation thermometer and the cavity 104 during the temperature calibration process. In other words, the present portable blackbody furnace 100 does not need to uses a huge amount of liquid, and therefore is portable.

The above-described embodiments of the present invention are intended to be illustrative only. Numerous alternative embodiments may be devised by those skilled in the art without departing from the scope of the following claims.

What is claimed is:

1. A portable blackbody furnace, comprising a metallic body having a cavity with an open end and a shielding plate positioned at the open end, and a first heater positioned in the shielding plate.

2. The portable blackbody furnace of claim 1, wherein the metallic body is made of oxygen free copper and the radial thickness is larger than 5 millimeters.

3. The portable blackbody furnace of claim 1, further comprising a plurality of second heaters surrounding the metallic body.

4. The portable blackbody furnace of claim 3, wherein the second heaters are heating wires surrounding the outer wall of the metallic body.

5. The portable blackbody furnace of claim 4, wherein the flow directions of the currents between two adjacent heating wires are opposite.

6. The portable blackbody furnace of claim 4, wherein the metallic body includes a plurality of grooves at the outer wall, and the heating wires are embedded in the grooves.

7. The portable blackbody furnace of claim 1, further comprising at least one thermometer positioned in the metallic body.

8. The portable blackbody furnace of claim 1, wherein the heat capacity of the metallic body is larger than 200 Joules/K.

9. A portable blackbody furnace comprising a metallic body having a cavity with an open end and a shielding plate positioned at the open end, wherein the ratio between the radial thickness of the metallic body and the radius of the cavity is larger than 1.5.

10. The portable blackbody furnace of claim 1, wherein the ratio between the heat capacity of the metallic body and the heat loss rate is larger than 4200.

11. The portable blackbody furnace of claim 1, wherein the cavity has a cylindrical shape.

12. The portable blackbody furnace of claim 3, further comprising a layer of high thermal conductive material coated on an outer wall of the metallic body.

13. The portable blackbody furnace of claim 12, wherein the second heaters are heating wires surrounding the outer wall of the metallic body.

14. The portable blackbody furnace of claim 13, wherein the flow directions of the currents between two adjacent heating wires are opposite.

15. The portable blackbody furnace of claim 13, wherein the metallic body includes a plurality of grooves at the outer wall, and the heating wires are embedded in the grooves.

16. A portable blackbody furnace, comprising:

a metallic body having a cavity with an open end;

a shielding plate position at the open end; and a plurality of first heaters positioned in the shielding plate.

17. The portable blackbody furnace of claim 16, further comprising a plurality of second heater surrounding the outer wall of the metallic body.

18. The portable blackbody furnace of claim 17, wherein the second heaters are heating wires surrounding the outer wall of the metallic body.

19. The portable blackbody furnace of claim 18, wherein the flow directions of the currents between two adjacent heating wires are opposite.

20. The portable blackbody furnace of claim 18, wherein the metallic body includes a plurality of grooves at the outer wall, and the heating wires are embedded in the grooves.

21. The portable blackbody furnace of claim 16, further comprising at least one thermometer positioned in the metallic body.

22. The portable blackbody furnace of claim 16, wherein the heat capacity of the metallic body is larger than 200 Joules/K.

23. The portable blackbody furnace of claim 16, wherein the ratio between the radial thickness of the metallic body and the radius of the cavity is larger than 1.5.

24. The portable blackbody furnace of claim 16, wherein the ratio between the heat capacity of the metallic body and the heat loss rate is larger than 4200.

25. The portable blackbody furnace of claim 16, wherein the cavity has a cylindrical shape.

* * * * *